United States Patent Office 3,271,858
Patented Sept. 13, 1966

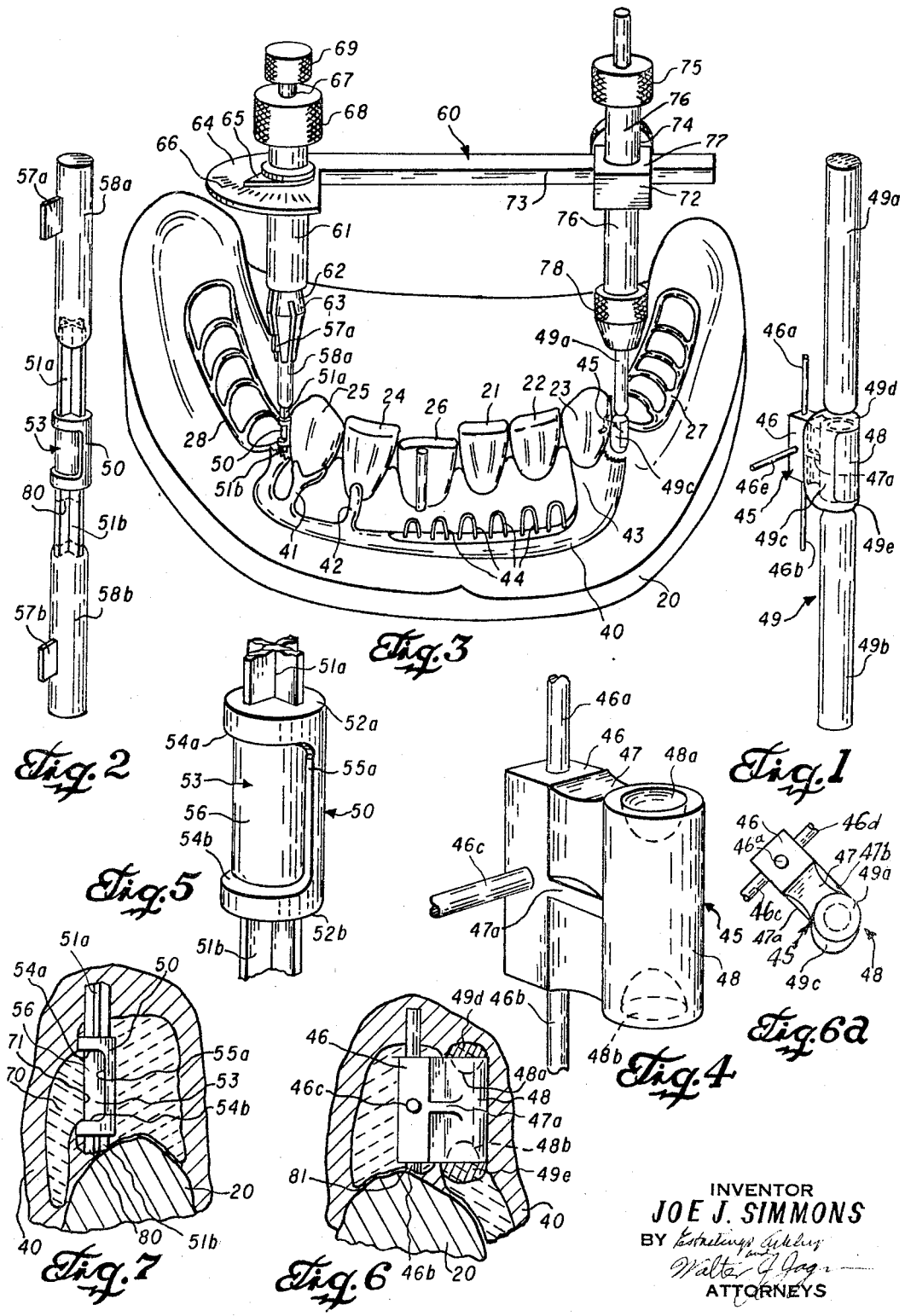

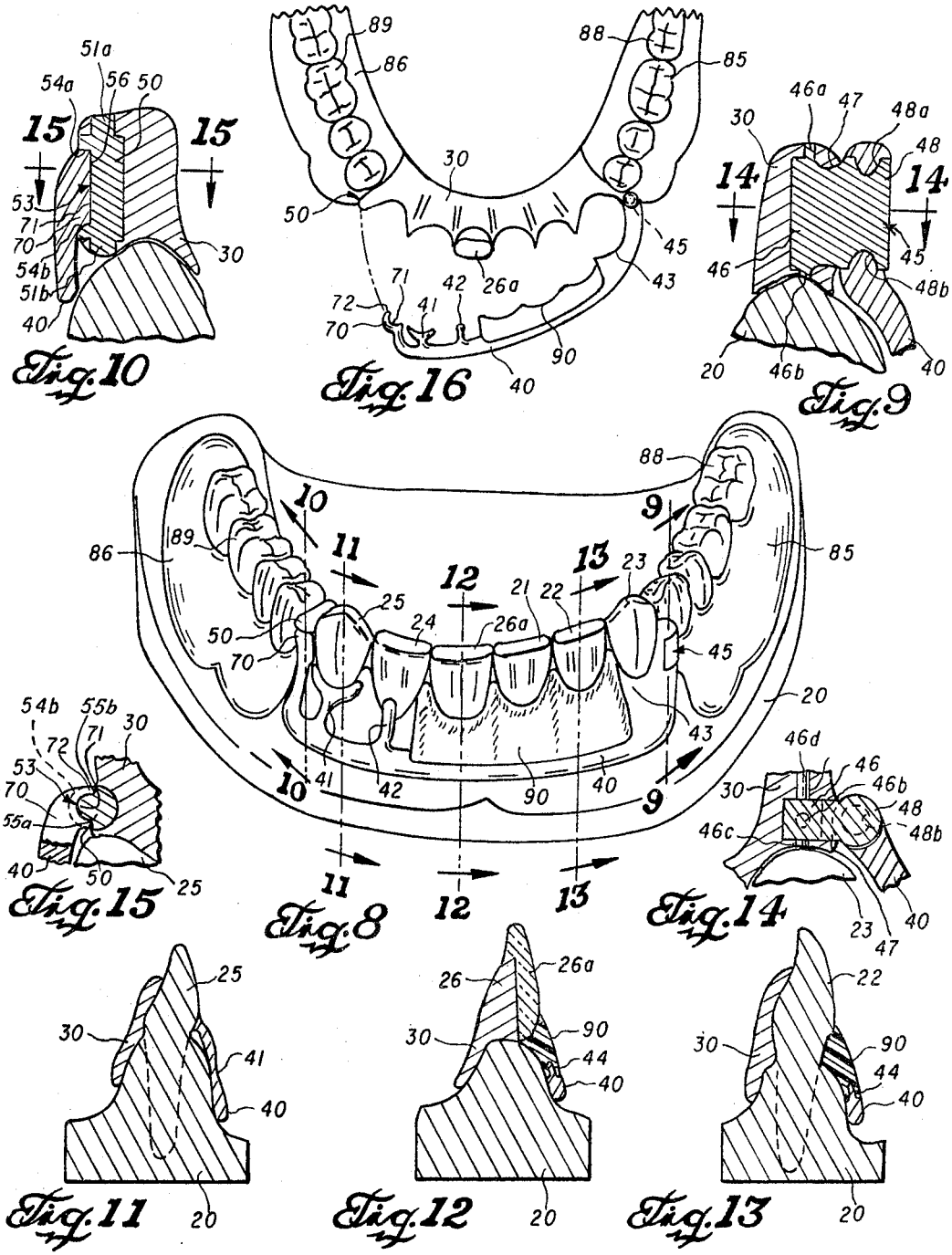

3,271,858
REMOVABLE DENTAL APPLIANCES AND
METHODS OF MAKING SAME
Joe J. Simmons, Dallas, Tex., assignor to Idea Development Company, Dallas, Tex., a corporation of Texas
Filed Jan. 28, 1964, Ser. No. 340,635
25 Claims. (Cl. 32—5)

This invention relates to removable dental appliances and to the methods and apparatus for making the same, and more particularly to dental appliances applicable in the fields of prosthetic, restorative periodontal and orthodontic dentistry, and the methods and means for making the same.

With the loss of natural teeth necessitating the installation of a partial denture or dental appliance, there are certain conditions attending the loss and subsequent substitution which are recognized as being important factors controlling the proper functioning of the dental appliance. Among the factors affecting the choice of dental appliances are the shrinking of the gums, the reduction or removal of the alveolar process or foundation upon which the prosthetic appliance is partially supported, often in multiple tooth loss the reduction of the alveolar processes is to such an extent that the lingual sulcus is substantially eliminated, that the retromolar pads are obliterated, and the buccal bearing area may be extremely narrow or small. In addition, the removal of all the molar teeth may have reduced the number of abutments available for anchoring and supporting the appliance, and the few remaining teeth may be mobile.

Thus, the loss of the natural teeth may present weak abutments, or unilateral abutments, or abutments which are unsuited for clasping or for restorative procedures because of the mobility, alignment and location of the remaining teeth, and the patient may require a removable appliance for the practice of proper oral hygiene to maintain the health of the remaining teeth.

It is, therefore, one object of the invention to provide an improved dental appliance which may be removably locked in place, and which is provided with means resisting dislodgment, lateral displacement, tipping action or rotary movement of the appliance, and that wherein the securing means accomplishes such a result without undue force applied to any one or all of the remaining natural teeth.

It is an important object of the invention to provide, in a dental appliance of the character set forth, with or without prosthetic replacement, means providing for splinting of the remaining natural teeth, should such teeth be mobile, and to reduce the stress imposed upon the remaining teeth by the appliance in use.

A further object of the invention is to provide a dental appliance of the character set forth wherein a stress cushioning effect under various masticatory loads is obtained; the design of such appliance providing for a double stress cushioning, in that, since the appliance usually has no occlusal stops, the appliance engages the remaining teeth apical to their greatest contour and a slight disengagement tends to occur under heavy posterior occlusal force, proportionately increasing the tissue bearing load, and because when a single or multiple natural tooth is under heavy load due to lateral or occlusal loads in mastication, the engagement of the appliance with the greatest contour of the tooth or teeth impresses a wedging force of the tooth or teeth and results in the application of a firmer supporting engagement between the tooth or teeth and the appliance, thus distributing the load to the appliance and its total supporting structures, not just the tooth or teeth under such loads.

Still another object of the invention is to provide an appliance of the character set forth which is removable for the purpose of maintaining proper oral hygiene by the wearer, and which may be worn, if desired, as a removable orthodontic appliance to solve esthetic problems usually associated with banding of the teeth, or may be used as a post orthodontic retainer which would give maximum stability and fixation yet be removable for proper oral hygiene or for esthetic reasons.

A still further object of the invention is to provide in a dental appliance of the character described means for reducing the mobility of all encompassed remaining natural teeth, for substantially increasing the stability and retention of a prosthetic appliance, for providing a solution for cosmetic problems associated with extreme recession of the gingival tisues around natural teeth by the provision of characterized plastic tissue replacement for covering these unusually exposed root portions of the teeth.

Still another object of the invention is to provide a dental appliance of the character set forth which is securely latched or locked in place by means of a labial bar and lingual section one investment casting, the labial bar being hinged at one end to the lingual section and locked at the other end to the lingual section by a latch which secures the labial bar to the lingual section and securely locks the encompassed remaining teeth between them, but the latch of which is releasable to permit the labial bar to swing outwardly to free the appliance for removal.

A particular object of the invention is to provide an improved dental appliance which is less expensive than many other methods known in the art and which may be formed quickly and expeditiously by dental technicians, which is adaptable to the "lost-wax" technique of metal casting, and which provides for or permits the easy replacement of subsequently removed natural teeth to the lingual section and the application or use of anterior plastic characterized tissue replacement for esthetic enhancement.

Still another object of the invention is to provide an improved hinge member for use in a dental appliance having labial bar and lingual section one investment castings to provide a hinged connection for the labial bar with the lingual section for swingably connecting the labial bar to the lingual section; and to provide a latch member for incorporation into the lingual section casting to provide means for releasably securing the free end of the labial bar to the lingual section casting to lock and secure the appliance in place.

Still another object is to provide a pre-cast metal hinge member and a pre-cast metal latch member of the character set forth which lend themselves to secure placement in the investment mold and are incorporated in the dental appliance by means of the lost-wax technique of metal casting, and which assure a satisfactory movable hinged mounting of the labial bar on the appliance and latching engagement of the labial bar with the appliance.

Still another object is to provide means for orienting the latch member parallel to the vertical axis and undercut to the radial axis of the hinge member in the dental appliance to assure proper functioning thereof.

A further object is to provide a pre-cast metal hinge member with attached aligning rods which may be distributed, as such, to dental laboratories and the like, and which comprises a pre-cast metal hinge member for attachment to one of two sections of a dental appliance and having a first part on said member eliminatable by heat from a mold and formed with oppositely extending and generally transversely disposed anchoring or positioning means on such pre-cast metal hinge member adapted for engagement with the investment mold for holding the metal hinge part in position for casting a second hinge part in direct hinged coaction with the first hinge part in such a manner that a hinge connection is formed which permits relative swinging movement between the two parts to allow relative swinging and clamping movement of the two sections of the appliance.

Another object of the invention is to provide a pre-cast metal latch member with alignment rods and tabs of plastic or metal which may be distributed as such in the same manner as the hinge member just mentioned and which is adapted for mounting in a lingual section of the dental appliance wax-up for coaction with the movable labial bar portion wax-up thereof carried by and movably connected with the lingual section, which latch member is engageable by a catch means formed by casting on the movable labial bar portion of the appliance for securing the labial bar portion in fixed relation with respect to the remainder of such appliance.

Additional objects and advantages of the invention will be readily apparent from the reading of the following description of a device constructed in accordance with the invention, and reference to the accompanying drawings thereof wherein:

FIGURE 1 is an isometric view of a pre-cast metal hinge socket member and handling means designed for use in carrying out the method and producing the appliance of the invention;

FIGURE 2 is an isometric view of a pre-cast metal latch member and handling means for use in conjunction with the hinge member of FIGURE 1;

FIGURE 3 is a perspective view of a typical lower investment model, showing the manner in which the hinge member and latch member are positioned in the wax-up of the design of a typical case under construction;

FIGURE 4 is an enlarged isometric view of the pre-cast metal hinge socket member of FIGURE 1;

FIGURE 5 is an enlarged isometric view of the pre-cast metal latch member of FIGURE 2;

FIGURE 6 is a vertical sectional view through the investment model, showing the disposition of the pre-cast metal hinge socket member and its remaining handling means in the wax-up in the investment mold;

FIGURE 6a is a top end view of the hinge member and handling means of FIGURE 1;

FIGURE 7 is a view similar to FIGURE 6 showing the disposition of the pre-cast metal latch member of FIGURE 5 in the investment mold;

FIGURE 8 is a perspective view of the dental appliance formed from the investment model of FIGURE 3, and showing the completed appliance mounted on the original stone model;

FIGURE 9 is a vertical sectional view taken on the line 9—9 of FIGURE 8 through the hinge portion of the appliance;

FIGURE 10 is a view taken on the line 10—10 of FIGURE 8 through the latch portion of the appliance;

FIGURE 11 is a vertical sectional view taken on the line 11—11 of FIGURE 8 and showing a splinting post or support for a mobile tooth that also serves as a direct retainer of the appliance;

FIGURE 12 is a view taken on the line 12—12 of FIGURE 8 and showing a replacement tooth carried by the lingual section and the characterized plastic tissue replacement therefor carried by the labial bar;

FIGURE 13 is a vertical sectional view taken on the line 13—13 of FIGURE 8 and showing a further modified splinting retaining and cosmetic characterized plastic tissue replacement on the labial bar of the appliance;

FIGURE 14 is a horizontal sectional view taken on the line 14—14 of FIGURE 9;

FIGURE 15 is a horizontal cross-sectional view taken on the line 15—15 of FIGURE 10; and FIGURE 16 is a top plan view of the dental appliance with the labial bar unlatched and swung outwardly toward its open position.

In the drawings, FIGURE 3, there is shown a lower investment model 20 of a person's mouth in which the natural teeth remaining comprise the lower left central incisor 21, the lower left lateral incisor 22, and the lower left cuspid 23, and the lower right lateral incisor 24 and the lower right cuspid 25. A backing or support 26 for a replacement for the lower right central incisor is shown disposed in position for waxing in the lingual section of the appliance. Also, the lower left saddle skeleton 27 and lower right saddle skeleton 28 are formed of plastic or wax on the investment model.

In the investment model as represented in FIGURE 3, the cuspid teeth 23 and 25 are the most distal abutment teeth and there is no molar abutment tooth present for supporting the appliance. A wax form of the usual lingual section 30, which is shown as a solid continuous metal section but may be an openwork or skeleton for tooth and tissue replacement, is formed in the usual manner on the lingual portion of the remaining natural teeth and the lingual alveolar section of the investment model 20, and is joined with the wax saddle skeletons 27 and 28 at the opposite ends thereof. The lingual section 30 may have waxed thereon the backing or support 26 for the replacement tooth for the right central incisor.

A wax form of a labial bar 40 is laid out and shaped on the labial portion of the alveolar section of the investment model 20 and is designed to be connected at its opposite ends with the lingual section in a manner which will hereinafter be more fully set forth. The labial bar 40 may include upright splinting struts, posts or supports 41, 42 and 43 and may be provided with a plurality of retention loops 44 for the reception and retention of plastic characterized tissue replacement, as will hereinafter be more fully explained.

As shown in FIGURE 3, a pre-cast metal hinge member 45 is disposed in the wax-up of the lingual section at a distal position with respect to the lower left cuspid 23, and a precast metal latch pin or member 50 is disposed in the wax-up of the lingual section of the appliance at a distal position with respect to the lower right cuspid 24. The precast metal part of the hinge member is shown in an enlarged view in FIGURE 4 and includes a rectangular base portion 46 having a concave lateral arm section 47, formed with medial laterally extending strengthening ribs 47a and 47b (FIG. 6a), supporting a cylindrical socket member 48 formed with opposed concave recesses 48a and 48b in its opposite ends for receiving the trunnions formed by casting on one end of the labial bar 40 as will hereinafter be more fully explained.

Longitudinally extending investment retainer posts 46a and 46b and laterally extending investment retainer posts 46c and 46d (FIGURES 4 and 14), hereinafter generally referred to as investment retainer posts or means, project from the rectangular base portion 46 of the hinge member 45 and are adapted to be positioned in the investment mold for holding the hinge member in position during the burn out and casting of the metal lingual section and labial bar by the lost-wax casting process. A portion of each of the posts 46a–46d, the rectangular base portion 46 and a portion of the concave lateral arm section 47 adjacent the rectangular base 46 are also disposed in the wax model of the lingual section as clearly shown in FIGURES 6 and 14; whereby the engagement of the posts and the rectangular base section of the hinge member with the metal forming the lingual section positively mechanically bonds or secures the hinge member in fixed position to the lingual section.

The latch member or pin 50 is preferably provided with cruciform longitudinally axially extending retainer sections 51a and 51b, hereinafter generally referred to as retainer sections 51, at its opposite ends, said cruciform retainer sections projecting from substantially transverse planar end surfaces 52a and 52b at the opposite ends of the latch member. The latch member is generally cylindrical in configuration and has a relieved lock or latching section 53 formed thereon and extending peripherally through approximately 180 degrees or half the circumference of the member. The recess is provided with an inwardly extending downwardly facing upper shoulder 51a and an inwardly extending upwardly facing lower shoulder 54b, and the bottom 56 of the recess is generally cylindrical in configuration and is defined by longitudinal inwardly extending lateral shoulders 55a and 55b (FIGURE 15), whereby a catch 70 formed on the free swinging end of the labial bar 40 may engage within the recess and be limited against movement vertically or longitudinally of said latch pin 50 by the shoulders 54a and 54b. Similarly the shoulders 55a and 55b provide abutments for limiting lateral swinging movement of the labial bar, while the curved cylindrical bottom 56 of the recess is engaged by the catch member of the labial bar, as will hereinafter be more fully explained, to retain the labial bar in supporting retaining position with respect to the lingual bar and the natural teeth encompassed or confined therebetween.

As is clearly shown in FIGURE 3, the hinge member 45 and the latch pin 50 are held in parallel relationship by means of a surveying or aligning and indexing device or fixture 60 having on one end a chuck sleeve 61 having a collar 62 for receiving one of the handling means or supporting shafts 58a or 58b formed of plastic, metal or the like cast on opposite ends of the cruciform retainers 51a and 51b of the latch pin 50. The cylindrical plastic extensions 58a and 58b have provided thereon positioning flanges 57a and 57b which project radially from and extend longitudinally of the cylindrical extensions in longitudinal alignment with each other and in a plane extending centrally and radially through the lock recess 53 of the latch pin. The flanges serve as orienting members for angularly orienting the position of the cut-away lock recess 53 of the latch pin 50. The flanges are adapted to be disposed in a longitudinally extending groove or slot 63 formed in the collet member 62 to be turned thereby. The collet member is securely wedged into the lower end of the chuck sleeve 61 whereby the collet member is rotated with the sleeve 61 as the sleeve is rotated in the indicator end 64 of the fixture 60. A pointer 65 is connected with the sleeve 61 and moves therewith over a scale 66 on the upper surface of the indicator end portion 64 of the fixture. The collet 62 is drawn into frictional gripping engagement with the extension 57a by a bolt member 67 threaded into the sleeve 61, the sleeve having a knurled head 68 and the bolt member having a knurled head 69 by means of which each may be held for relative rotation to draw the collet into clamping engagement with the extension 57a. The indicia of the scale 66 are divided into angular increments for the purpose of orienting the relieved latching portion 53 of the latch pin 50 with respect to the labial bar 40 to assure that the catch of the labial bar, to be hereinafter more fully described, is properly engaged therewith.

The hinge member 45 is similarly provided with handling means generally designated as 49, which handling means includes extension members 49a and 49b formed of plastic or the like at the opposite ends of the hinge member and disposed in longitudinal axial alignment with the cylindrical socket section 48 of the hinge member whereby the hinge member may be disposed in accurate parallel operating relationship with the latch pin 50 by means of the fixture. One of the extension members 49a or 49b is slidably disposed with a close sliding fit in the lower bore of a chuck 78 carried on the lower end of a sleeve 76 which is slidable longitudinally on the slide member 77 slidably carried on the bar 73 of the fixture 60. A lockscrew 74 secures the slide 72 in adjusted positions on the bar with respect to the chuck sleeve 61 on the opposite end of the fixture. A knurled finger piece 75 on the upper end of the sleeve 76 is used for rotating the sleeve about its longitudinal axis and the chuck 78 holds the hinge member in its vertical position extending parallel to the latch pin member 50 carried by the collet member 62 at the opposite end of the fixture.

It will thus be seen that the hinge member and the latch pin are disposed in parallel relationship to each other and may be disposed at any desired position with respect to the lingual section of the dental appliance whereby the labial bar 40 carried by the hinge member 45 will swing about the vertical axis of the hinge socket section between the recesses 48a and 48b. Thus, the labial bar 40 will always swing about the longitudinal axis of the cylindrical socket section 48 of the hinge member 45, and the catch 70 on the opposite swingable end of the labial bar will be moved in a plane perpendicular to the axis of such socket member and into and out of engagement with the cut-away latch portion 53 of the latch pin 50, as will hereinafter be more fully explained.

The plastic extensions 49a and 49b of the handling means 49 on the hinge member are connected to a central plastic hinge trunnion portion 49c which is disposed laterally of the socket portion 48 of the hinge member and which is connected at its opposite ends to the extensions by means of lateral trunnion extensions 49d and 49e which overlie the ends of the socket portion 48 and extend into the sockets 48a and 48b to form the casting cavity for the trunnion portions of the hinge on the labial bar when the plastic portion is burned away during the lost-wax process.

As shown in FIGURE 6a, the C-shaped trunnion section of the handling means 49 for the hinge member overlies only that portion of the hinge member formed by the socket section 48, the inwardly extending lateral extensions 49c and 49d covering the ends of the socket portion 48 and the trunnion portion 49c lying along the cylindrical portion of the socket section at a position offset somewhat angularly from the concave lateral arm section 47 of the hinge member as shown in FIGURE 6a, so that when the plastic is burned off in the lost-wax process, the metal casting of the labial bar will fill the space formerly occupied by the trunnion portion 49c, as well as the portions occupied by the lateral extensions 49d and 49e to form a continuous one piece metal hinge trunnion at that end of the labial bar. As is shown in FIGURES 3 and 6a, the wax form for the labial bar 40 is brought into abutting continuity with the trunnion portion 49c and the lateral extensions 49d and 49e, so that the wax form of the labial bar and the plastic trunnion portion and the lateral extensions form a continuous cavity in the investment mold when burned out, whereby when cast the trunnions are an integral part of the labial bar.

At its latch end, the labial bar is formed with a catch member 70 which is shaped of wax on the pre-cast metal latch member in the recess 53 in such a way that a semicircular concave hook or catch recess 71 is formed therein corresponding to the latching recess 53 of the latch pin. The wax is so shaped that the catch portion of the labial bar enters the recess 53 and, when the wax is burned away in the lost-wax process and the metal is cast, the metal of the labial bar forms a hook type catch 70 having a hook recess 71 which engages in the latching recess 53 to positively retain the labial bar in the closed supporting position shown in FIGURE 8. It will be noted that the recess 71 is so disposed with respect to the recess 53 that when the labial bar is in closed position the extreme outer tip portion 72 of the catch is disposed in a portion of the recess 53 which is nearer the hinge socket 48 than is the outer portion of the bottom 56 of the latching recess, so that the catch is held against ready displacement from its position in the recess and the labial bar is firmly restrained in its closed position. It will be noted that the recess 53 forms an excellent guide or mold for the waxings of the catch member 70, as shown in FIGURE 7.

As shown in FIGURES 3, 6 and 7, the lower retainer portions of the latch pin 50 and of the hinge member 45 are cut away, as shown at 80 on the latch pin and as shown at 81 on the hinge, whereby the cruciform retainer 51b of the latch pin is shortened and may touch but does not engage the alveolar process portion of the investment model, and the lower retainer shaft 46b of the hinge member likewise does not engage the alveolar process portion of the investment model at that point. This permits placement of the hinge member and the latch pin at any desired vertical position with respect to the investment model and the elements of the dental appliance to secure the desired results. It will also be noted that the lateral retainer shaft 46c of the hinge member is trimmed, to fit the base of the hinge into close proximity to the most distal abutment 23 of the appliance as shown in FIGURE 14.

After the members have been properly disposed in the wax form, the plastic handling means 49 for the hinge member above the socket section thereof is cut away above the lateral trunnion extension 49d and the cruciform retainer member 51a is likewise cut away slightly above the upper surface of the wax form of the lingual section to permit the forming of the complete investment mold about the investment model and completed wax-up. The retainers 51a and 51b for the latch pin and the retainers 46a, 46b, 46c and 46d for the hinge member are then disposed in the investment mold when the same is formed and will securely retain their position when the wax and the volatile plastic is burned away during the lost-wax processing of the investment mold.

It will be readily apparent that the upper and lower portions of the handling means of the latch member are mirror images of each other, as are the upper and lower portions of the handling means of the hinge member, so that the members can be reversed in position on the appliance; i.e., the positions in which they are shown in the drawing.

The plastic material of which the position flanges and handling means of the latch member and the handling means, hinge trunnion portions and lateral extensions of the hinge member are formed is preferably of a volatile plastic, such as polystyrene or the like, whereby when the wax and plastic are burned out in the investment mold in carrying out the lost-wax process of casting the appliance, there will be no residue in the mold cavity and a clean, full casting will be produced.

The labial bar, lingual section, open work and the like are formed on the investment model by "waxing," in which the applcation of bar sheets, strips and rods of wax or plastic to the outlined design of the investment model by heating, shaping, trimming and smoothing of the wax or plastic until the design of the labial bar, the lingual section and the saddles is achieved. Subsequently, the wax pattern and the plastic portions of the hinge are invested or flasked within a metal ring, and, following the investment, the wax and plastic is burned out of the invested mold in the usual manner to provide a cavity which is an exact duplicate of the desired shape of the metallic frame of the labial bar, the lingual section and the lateral saddles of the dental appliance.

The cavity within the investment mold and around the model is then cast with molten metal from a crucible, which metal is carried to the inner molds by suitable sprues or passages. The metal preferably used is a chrome cobalt alloy, which may be any one of several on the market, or any other suitable material which is of a high melting point, high strength and rigidity. While a chrome cobalt alloy is preferred, other metallic compositions such as a high strength heat treated gold, such as ADA Type D gold, or the like may be used. Following the casting of the molten metal into the cavity in the investment mold and the cooling of the metal, the investment mold is cracked and the metallic frame is removed for the technician's further work involving grinding, polishing, shaping and general finishing of the casting. At this time, any projecting portions of the retainer shafts or cruciform retainers for the hinge member and for the latch member are ground and polished flush. Also, because of the characteristics of the chrome cobalt alloys, the preformed surfaces of the pre-cast hinge member 45 and of the pre-cast latch member 50 which are exposed in the mold oxidize and do not fuse with the metal cast into the investment mold. The oxidized surfaces, which prevent fusion of the form metal and the cast metal, may be separated and thus permit movement of the labial bar with respect to the remainder of the appliance. If gold metal is used for the casting, it may be pre-oxidized with Anti-flux to prevent fusion of the labial bar with the lingual section hinge member and latch member. Cleaning will facilitate pivotal movement of the labial bar on the hinge member 48 and the engagement of the catch 70 with the latch pin 50. It will also be noted that in the contraction and cooling of the cast labial bar, the male trunnion members will reduce slightly in size and therefore be slightly smaller than the sockets 48a and 48b, and will provide a more freely movable hinge connection with the socket member 48. Likewise, the catch end 70 of the labial bar, being a female member, shrinks or contracts and moves into tight mechanical engagement with the relieved latching surface 53 of the latch pin.

Following the polishing of the metal framework of the dental appliance, suitable plastic characterized tissue replacements 85 and 86 and tooth replacements 88 and 89 are applied to and processed on the saddles 27 and 28, and tissue replacement 90 is applied to and processed on the portion of the labial bar on which the retention loops 44 are formed, all in the usual manner, the tissue replacement taking the form shown in FIGURES 8 and 16 and covering the labial gingival portions of the alveolar process, as shown in FIGURE 8 and FIGURES 12 and 13. Similarly, the replacement 26a for the lower right central incisor is affixed to the backing 26 in the usual manner and matched with the tissue replacement to provide a natural appearance. It will be noted that the metal strut (FIG. 11) and tissue replacement of the labial bar as shown in FIGURE 13 engages the natural teeth apical to their greatest contour thus engaging multiple undercuts of the natural teeth and securely locking the appliance to them. The characterized plastic 90 (FIG. 13) also covers any receded gingival condition, thus adding to the esthetic appearance of the appliance in the mouth of the wearer.

In use, the appliance is disposed in the mouth with the lingual section 30 in engagement with all the adjacent remaining teeth, and with the saddles 85 and 86 resting on the molar and bicuspid portions of the alveolar process. The labial bar 40, during installation, is moved to the open position shown in FIGURE 16, wherein the labial bar does not contact any of the natural teeth of the user patient. However, when the appliance has been seated in the mouth with the lingual section 30 and the saddles properly disposed, the labial bar 40 is then swung inwardly toward the teeth to engage the catch member 70 with the latch recess 53 in the latch pin or member to positively clamp the encompassed remaining natural teeth between the labial bar and the lingual section and to provide the other advantages hereinafter set forth.

It is believed readily apparent that any natural tooth which is lost subsequent to the manufacture of the dental appliance, such as the lower right lateral incisor 24, the lower left central incisor 21 and the lower left lateral incisor 22 may be easily and economically relpaced by addition to the lingual bar of suitable retaining loops or perforations for the replacement teeth and processing the replacement teeth on the lingual section without changing the original bio-mechanical design.

It is also to be noted that if a substantial downward force is applied to the saddle portion of the appliance, the appliance is moved downwardly relative to the remaining natural teeth, since there are usually no occlusal stops in engagement with the teeth. However, any tilting or downward swinging movement of the saddle portions with respect to the natural teeth is resisted by the engagement of the splint members 41 and 42 and the tissue replacement 90 with the natural teeth. As a further stress reducing advantage of this type of appliance, uneven lateral occlusal force applied to the appliance on one side or the other which results in a tilting or lateral swinging movement on the appliance is resisted because of the engagement of the splint members 41 and 42 and the tissue replacement 90 and the lingual section 30 with the labial and lingual portions of the natural teeth to resist such tilting movement. Also such forces as cause rotary movement of the appliance are resisted by the same means. Thus, the force applied to the appliance is spread over all the remaining natural teeth, and alveolar support, and is not applied solely to the abutment teeth and alveolar support as is the usual clasp type partial denture. Furthermore, the denture is held more rigidly and immovably in place by the clamping action of the swingable labial bar and the lingual section.

It is believed readily apparent that, while the dental appliance which has been described heretofore is illustrated and described as being constructed for use on the lower jaw or mandible of the user patient, the same process and procedures, and hinge members, latch members and fixtures may be used in forming and constructing a dental appliance for the upper jaw or maxilla to provide all the same results and advantages which are set forth with regard to the appliance for the lower jaw or mandible. The hinge member and the latch member, each having the plastic handling means extending from opposite ends thereof, are readily adaptable for mounting from either end in a dental appliance, and may be used equally well in either type appliance.

Due to the fact that the lingual section and the labial bar are engaged under the maximum curvature of the remaining teeth clamped therebetween, it is physically impossible, so long as the bar remains engaged in the latched position or closed clamping position to dislodge the appliance from its position. This is a particular advantage during the heavy loads sometimes encountered in mastication, and during speech, yawning and the like.

It will thus be seen that an improved dental appliance has been provided which may be removably locked in place in the mouth of the user, clamping the encompassed natural teeth of the user between the lingual section and the movable labial bar provided on the appliance, to resist dislodgment, lateral displacement, tipping action or rotary movement of the appliance; and, wherein the clamping or securing means accomplishes such results without undue force being applied to any or all remaining natural teeth, because of the fact that the forces tending to cause such movements are spread by means of the splinting elements of the appliance over all the remaining natural teeth encompassed between the lingual section and labial bar and by the alveolar ridges by virtue of the permissible compression movement of the entire appliance resulting from the disposition of the lingual section and labial bar apically of the greatest contour of the natural teeth.

It will also be noted that the appliance provides for splinting of mobile remaining natural teeth to preserve the same and increase the life of such teeth, and to reduce the stress imposed on the natural remaining teeth. This result is also accomplished by spreading any force tending to move the appliance or to move the natural teeth over all the teeth and over the full appliance to the alveolar ridges.

It will particularly be noted that the appliance is designed for double stress cushioning, since there are usually no occlusal stops on the appliance, and the labial bar of the appliance engages the remaining natural teeth apical to their maximum contour and a slight disengagement of the appliance with such teeth may occur under heavy posterior occlusal force, and that such disengagement proportionately increases the tissue bearing load and spreads the load over the tissues in a more uniform manner since the saddles tend to be displaced perpendicular to the alveolar ridges and are not tipped as is usual with the average clasp type appliance. Likewise, when single or multiple natural teeth are under heavy stress due to occlusal load, the engagement of the appliance with the undercut of the tooth impresses a wedging force on the teeth and results in the application of a firmer wedging gripping supporting engagement between the teeth under load and the appliance to resist tooth movement due to such load.

Also, it will be seen that an improved appliance has been provided which accomplishes all the results set forth and likewise provides for proper oral hygiene by the wearer and to solve esthetic problems for the patient wearer by concealing or covering extremely receded or retracted gingival tissue conditions. The appliance is also adaptable for increasing stability of mobile teeth, with or without replacement teeth, and for retention of a removable device for use as an orthodonic appliance, and to solve esthetic problems arising in such use by providing a removable device which assures a firm support or tooth moving pressures when in use and which may be removed to permit proper oral hygiene and for esthetic or social reasons.

It will further be seen that the dental appliance is readily adaptable for manufacture by the "lost-wax" technique of metal casting, and is less expensive than fixed restorative splints, precision attachment partials or many other prosthetic devices, quickly and expeditiously by dental technicians from an improved pre-cast hinge member and pre-cast latch member which may be sold or distributed, as such, to dental laboratories and technicians for use in constructing the appliances, and which can, when so used, result in the provision of an appliance having the benefits set forth.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A dental appliance including: a lingual section adapted to engage an abutment tooth; a labial bar adapted to engage said abutment tooth; a first hinge member carried by said lingual section; a second hinge member carried by said labial bar at one end thereof and hingedly secured to said first hinge member whereby the free end of said labial bar may swing with respect to said lingual section; and a latch member carried by said lingual section and a catch member carried by the free end of said labial bar and engageable with said latch member of said lingual section for releasably securing said free end of said labial bar to said lingual section to clamp the abutment tooth therebetween.

2. A dental appliance including: a lingual section adapted to engage an abutment tooth; a labial bar adapted to engage said abutment tooth; a first hinge member carried by said lingual section; a second hinge member carried by said labial bar at one end thereof and hingedly secured to said first hinge member whereby the free end of said labial bar may swing with respect to said lingual section; and a latch member carried by said lingual section and a catch member carried by the free end of said labial bar and engageable with said latch member of said lingual section for releasably securing said free end of said labial bar to said lingual section to clamp the abutment tooth therebetween; and a dental restoration connected with said lingual section.

3. A dental appliance including: a lingual section; a hinge member connected with said lingual section; means on said hinge member engaging said lingual section for fixedly holding said hinge member against movement with respect to said lingual section; a latch member connected with said lingual section and having a latch surface thereon exposed anteriorly of said lingual section; a labial bar; means on one end of said labial bar connected with said hinge member on said lingual section whereby said labial bar is swingably connected to said lingual section by said hinge member and the opposite end of said labial bar is free to swing; and a catch member on said opposite end of said labial bar engageable with the latch surface of said latch member for releasably securing said labial bar to said lingual section.

4. A dental appliance including: a lingual section having a dental replacement connected therewith; a hinge member connected with said lingual section; means on said hinge member engaging said lingual section for fixedly retaining said hinge memebr against movement with respect to said lingual section; a latch member connected with said lingual section and having a latch surface thereon exposed anteriorly of said lingual section; a labial bar; means on one end of said labial bar connected with said hinge member on said lingual section whereby said labial bar is swingably connected to said lingual section by said hinge member and the opposite end of said labial bar is free to swing; and a catch member on said opposite end of said labial bar engageable with the latch surface of said latch member for releasably securing said labial bar to said lingual section, whereby said labial bar and said lingual section are adapted to clamp a user's remaining natural encompassed abutment teeth therebetween.

5. In a dental appliance having bi-lateral saddles and a lingual section connecting the same, a labial bar; a hinge member connected with said lingual section and hingedly swingably mounting one end of said labial bar on said lingual section; and co-operating latch means on said lingual section and the opposite end of said labial bar for securing such opposite end of said labial bar releasably to said lingual section to clamp abutment teeth therebetween.

6. A method of forming a dental appliance, which method includes: providing an investment model of the jaw of a patient; forming a lingual section wax-up on said investment model; disposing a metallic hinge socket member in said lingual section wax-up; disposing a metallic latch member in the wax-up of said lingual section spaced from said hinge socket member; forming a wax-up of a labial bar on said investment model having one end connected to said hinge member and having catch means at its opposite end engaged with said latch member; forming an investment mold for said wax-up; casting a metal form of said lingual section and said labial bar by the lost-wax process; and removing said metal casting from said investment mold.

7. A one investment method of forming a dental appliance, which method includes: providing an investment model of the jaw of a patient; forming a lingual section wax-up on said investment model; disposing a metallic hinge socket member in said lingual section wax-up; disposing a metallic latch member in the wax-up of said lingual section spaced from said hinge socket member; forming a wax-up of a labial bar on said investment model having one end connected to said hinge member and having catch means at its opposite end engaged with said latch member; forming an investment mold for said wax-up; casting a metal form of said lingual section and said labial bar simultaneously in said investment mold by the lost-wax process; and removing said metal casting from said investment mold.

8. A method of forming a dental appliance, which method includes: providing an investment model of the jaw of a patient; forming a lingual section wax-up on said investment model having connected therewith a model of a dental replacement; disposing a metallic hinge socket member in said lingual section wax-up; disposing a metallic latch member in the wax-up of said lingual section spaced from said hinge socket member; forming a wax-up of a labial bar on said investment model having one end connected to said hinge member and having catch means at its opposite end engaged with said latch member; forming an investment mold for said wax-up; casting a metal form of said lingual section, said dental replacement and said labial bar by the lost-wax process; and removing said metal casting from said investment mold; and completing the dental replacement.

9. A one investment method of forming a dental appliance which includes: providing an investment model of the jaw of a patient; forming a lingual section wax-up on said investment model having connected therewith a model of a dental replacement; disposing a metallic hinge socket member in said lingual section wax-up; disposing a metallic latch member in the wax-up of said lingual section spaced from said hinge socket member; forming a wax-up of a labial bar on said investment model having one end connected to said hinge member and having catch means at its opposite end engaged with said latch member; forming a single investment mold for said wax-up; casting a metal form of said lingual section, said dental replacement and said labial bar simultaneously in said single investment mold by the lost-wax process; and removing said metal casting from said investment mold; and completing the dental replacement.

10. A dental appliance of the character set forth in claim 4, wherein the hinge member for hingedly mounting the labial bar for clamping movement with respect to the lingual section includes: a base portion; said retaining means carried by said base portion and projecting therefrom, said retaining means providing for retaining said base portion of said hinge member in said lingual section of said dental appliance; a lateral projecting arm portion carried by said base portion and projecting therefrom substantially normal to said retaining means; and hinge means carried by said laterally projecting arm member and spaced from said base portion and having opposed socket means at opposite ends thereof.

11. A dental appliance of the character set forth in claim 1, wherein the latch member includes: a body portion having a longitudinal axis and an external latch recess formed therein providing opposed inwardly extending and upwardly and downwardly facing shoulders at the lower and upper ends respectively of said recess; and retainer means projecting longitudinally axially outwardly from the opposite ends of said body portion and engaged with the lingual section to prevent movement of said latch member with respect to said lingual section.

12. A dental appliance of the character set forth in claim 1, wherein the latch member includes: a body portion having a longitudinal axis and an external recess formed therein and having a cylindrical peripheral base surface extending through an angle of approximately 180 degrees about the longitudinal axis of the body portion and providing opposed inwardly extending and upwardly and downwardly facing shoulders at the lower and upper ends respectively of said recess; and cruciform retainer means projecting longitudinally axially outwardly from the opposite ends of said body portion and engaged with the lingual section to prevent movement of said latch member with respect to said lingual section.

13. A dental appliance of the character set forth in claim 4 wherein the hinge member adapted for use in said dental appliance for hingedly mounting said labial bar for clamping movement with respect to said lingual section in said appliance includes: an elongate rectangular base portion; said retaining means including a pair of retaining rods carried by said base portion and projecting from opposite sides of said base portion and a pair of retaining rods projecting from opposite ends of said base portion, said retaining rods being cast in the lingual bar of the dental appliance for retaining said base portion in said lingual bar; a laterally projecting arm portion carried by said base portion and projecting from one side thereof between the lateral rods; and hinge means carried by said laterally projecting arm portion and spaced from said base portion and having spaced opposed socket means thereon disposed in axial alignment with each other.

14. A dental appliance of the character set forth in claim 1 wherein the first hinge member includes: an elongate rectangular base portion; retaining means including retaining members carried by said base portion and projecting from opposite sides of said base portion and retaining members projecting from opposite ends of said base portion, said retaining means being cast in the lingual section of the dental appliance for retaining said base portion in said lingual section; a laterally projecting arm portion having concave surfaces therein carried by said base portion and projecting from one side thereof between the lateral retaining means and in a plane normal to said retaining means, said concave portions of said projecting arm portion serving to aid in retaining said base portion in said lingual section in said dental appliance; hinge means carried by said laterally projecting arm portion and spaced from said base portion and having spaced opposed socket means thereon disposed in axial alignment with each other.

15. A dental appliance of the character set forth in claim 4, wherein the latch member includes: a body portion having a longitudinal axis and an external recess formed therein and providing opposed inwardly extending and upwardly and downwardly facing shoulders at the lower and upper ends, respectively, of said recess; retainer means projecting longitudinally axially outwardly from at least one of the opposite ends of said body portion.

16. A dental appliance of the character set forth in claim 1, wherein the latch member includes: a body portion having a longitudinal axis and an external recess formed therein and having a cylindrical peripheral base surface extending about the longitudinal axis of the body portion and providing opposed inwardly extending and upwardly and downwardly facing shoulders at the lower and upper ends, respectively, of said recess; retainer means projecting longitudinally axially outwardly from at least one of the opposite ends of said body portion engageable with said lingual section to retain said latch member in position with respect to said lingual section.

17. A dental appliance of the character set forth in claim 1, wherein the latch member includes: a body portion having a longitudinal axis and an external recess formed therein and having a cylindrical peripheral base surface extending through an arc of approximately 180 degrees about the longitudinal axis of the body portion and providing opposed inwardly extending and upwardly and downwardly facing shoulders at the lower and upper ends, respectively, of said recess; retainer means projecting longitudinally axially outwardly from at least one of the opposite ends of said body portion engaged with said lingual section to retain said latch member against movement with respect to said lingual section.

18. The method of forming a dental appliance adapted to be releasably clamped in encompassing relationship about at least one natural tooth of a user of said appliance, which method includes: forming a lingual section having a substantial vertically disposed hinge socket member therein and latch means therein spaced from said hinge socket member; and forming labial bar means having means at one end swingably connecting said end of said labial bar means with said hinge socket member of said lingual section, and having catch means at its opposite end spaced from said hinge socket member and engageable with said latch means of said lingual section to releasably secure said opposite end of said labial bar means to said lingual section to dispose said labial bar means in anteriorly spaced relationship with respect to said lingual section.

19. A dental appliance adapted to be releasably clamped in encompassing relationship about at least one natural tooth of a user of said appliance, said appliance including: a lingual section having a substantially vertical hinge member therein and latch means therein spaced from said hinge member; labial bar means having means at one end swingably connecting said one end of said labial bar means with said hinge member of said lingual section and having catch means at its opposite end spaced from said hinge member and engageable with said latch means of said lingual section to releasably secure said opposite end of said labial bar means to said lingual section to dispose said labial bar means in anteriorly spaced relationship with respect to said lingual section.

20. A dental appliance of the character set forth in claim 19 and including: dental splinting and supporting means connected with one of said lingual section and labial bar means and engageable with one or more natural teeth encompassed therebetween.

21. A dental appliance including: a lingual section, labial bar means, hinge means swingably connecting one end of said labial bar means with said lingual section, and cooperating latch means on said lingual section and the opposite end of said labial bar means for securing such opposite end of said labial bar means releasably to said lingual section in position adapted to clamp an abutment tooth therebetween.

22. A dental appliance of the character set forth in claim 21 wherein: means is provided on one of the lingual section and labial bar means engageable with the remaining natural tooth encompassed therebetween apically of the greatest contour of said remaining natural tooth.

23. A dental appliance of the character set forth in claim 21 wherein: means is provided on the labial bar means for engagement of the encompassed natural tooth apically of the greatest contour of said tooth on the labial surface thereof.

24. A dental appliance of the character set forth in claim 1 wherein: the lingual section and labial bar means include means adapted to engage the encompassed remaining natural abutment tooth apically of the greatest contours of said tooth, whereby said appliance is free to move apically of the tooth upon application of masticatory force to the appliance.

25. A dental appliance of the character set forth in claim 5 wherein the lingual section and labial bar include means adapted to engage the abutment tooth clamped therebetween apically of the greatest contour of said tooth to permit apical movement of the saddles carried by the appliance toward the tissue bearing area of the user beneath.

References Cited by the Examiner

UNITED STATES PATENTS

| | | | |
|---|---|---|---|
| 832,528 | 10/1906 | Bennett | 32—5 |
| 1,136,100 | 4/1915 | Chayes | 32—67 |
| 1,140,566 | 5/1915 | Boos | 32—5 |
| 1,732,899 | 10/1929 | Krasnoff | 32—5 |
| 2,398,573 | 4/1946 | Becker | 16—128 |
| 2,675,615 | 4/1954 | Rosenberg | 32—67 |
| 2,775,013 | 12/1956 | Pedrero | 24—248 |
| 2,797,482 | 7/1957 | Zahn | 32—5 |
| 2,866,248 | 12/1958 | Reno | 24—248 |
| 3,087,192 | 4/1963 | Hertzke | 16—128 |

RICHARD A. GAUDET, *Primary Examiner.*

ROBERT E. MORGAN, *Assistant Examiner.*